June 13, 1961 — T. BERGLAND — 2,987,850
SOUNDING ATTACHMENT FOR BICYCLES
Filed Nov. 9, 1959 — 2 Sheets-Sheet 1
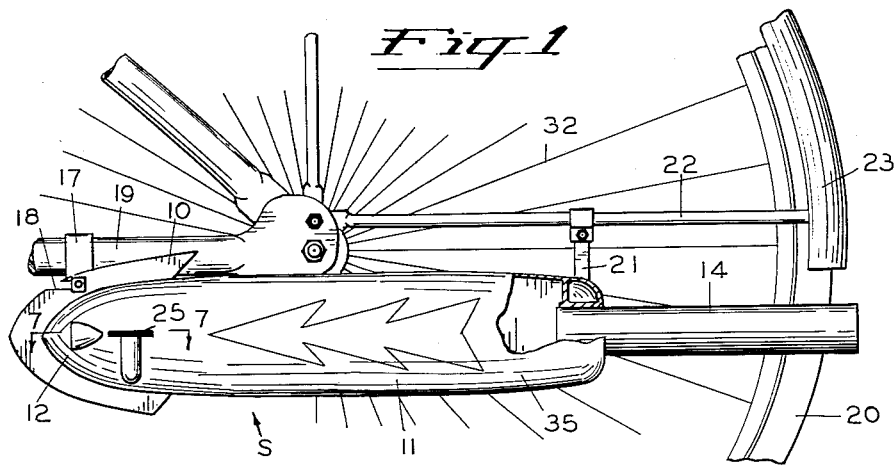
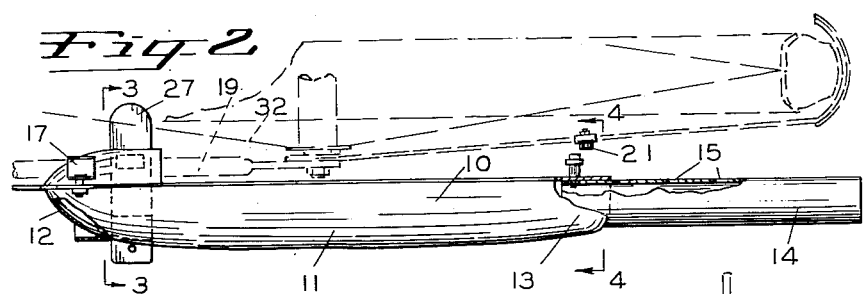
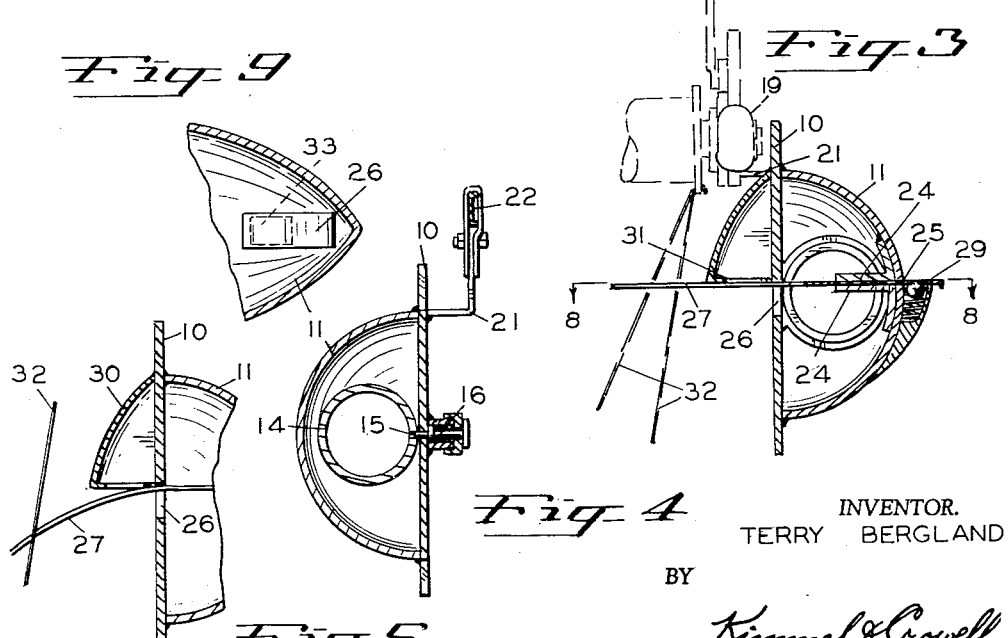
INVENTOR.
TERRY BERGLAND
BY
Kimmel & Crowell
ATTORNEYS June 13, 1961   T. BERGLAND   2,987,850
SOUNDING ATTACHMENT FOR BICYCLES
Filed Nov. 9, 1959   2 Sheets-Sheet 2
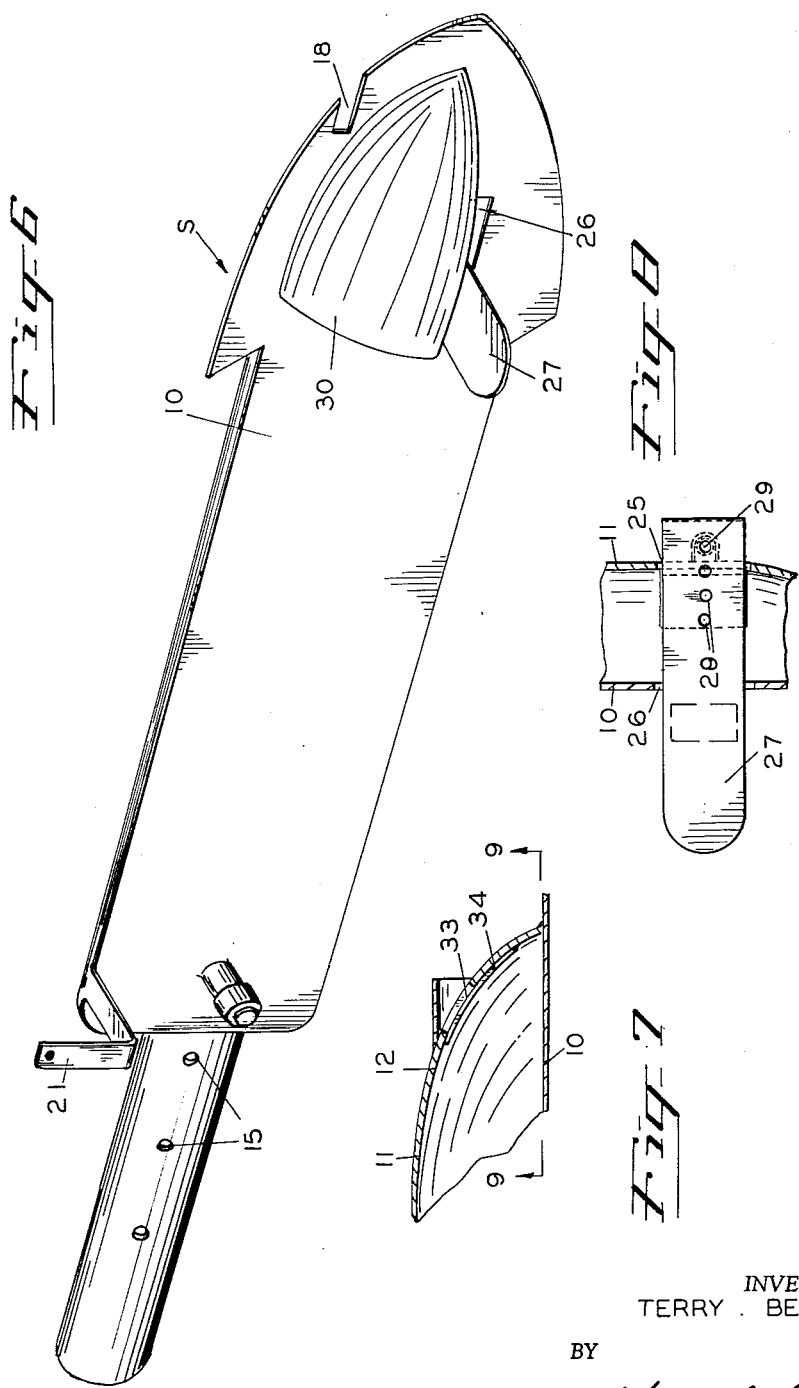
INVENTOR.
TERRY . BERGLAND
BY
Kimmel & Crowell United States Patent Office 2,987,850
Patented June 13, 1961

2,987,850
SOUNDING ATTACHMENT FOR BICYCLES
Terry Bergland, 4444 SE. 52nd St., Portland, Oreg.
Filed Nov. 9, 1959, Ser. No. 851,621
1 Claim. (Cl. 46—175)

The present invention relates to a sounding attachment for bicycles and the like.

The primary object of the invention is to provide a sounding attachment for bicycles so that upon operation of the bicycle the sounding device will simulate the noise of a motorcycle.

Another object of the invention is to provide a sounding attachment for bicycles of the class described above having a reed sounder actuated by the bicycle spokes upon rotation of the bicycle wheels.

A further object of the invention is to provide a sounding attachment for bicycles of the class described above in which the reed can be adjusted to vary the sound emitted therefrom.

Other objects and advantages will become apparent in the following specification when considered in light of the attached drawings, in which:

FIGURE 1 is a side elevation of the invention shown attached to the rear wheel of a bicycle;

FIGURE 2 is a top plan view of the structure illustrated in FIGURE 1 shown partially broken away for convenience of illustration, with the bicycle shown in broken lines;

FIGURE 3 is an enlarged fragmentary vertical sectional view taken along the line 3—3 of FIGURE 2, looking in the direction of the arrows;

FIGURE 4 is an enlarged fragmentary sectional view taken along the line 4—4 of FIGURE 2, looking in the direction of the arrows;

FIGURE 5 is a view similar to FIGURE 3 with the reed operating;

FIGURE 6 is a perspective view of the attachment removed from the bicycle;

FIGURE 7 is an enlarged fragmentary horizontal sectional view taken along the line 7—7 of FIGURE 1, looking in the direction of the arrows;

FIGURE 8 is a horizontal sectional view taken along the line 8—8 of FIGURE 3, looking in the direction of the arrows; and FIGURE 9 is a vertical sectional view taken along the line 9—9 of FIGURE 7, looking in the direction of the arrows.

Referring now to the drawings in detail wherein like reference characters indicate like parts throughout the several figures, the sounding attachment for bicycles is indicated generally by the reference character S.

The sounding attachment S includes an elongated generally flat plate 10 arranged in upright relation having a semi-cylindrical body member 11 secured in longitudinally extending relation thereto. The body member 11 has a pointed forward end 12 at the forward end thereof and a reduced diameter end portion 13 formed on the opposite end thereof. A tail piece 14 is slidably mounted in the reduced diameter portion 13 of the body 11.

The tubular tail piece 14 has a plurality of longitudinally spaced bores 15 formed therein. A spring loaded sliding pin 16 is mounted on the plate 10 and is adapted to releasably engage in a selected one of the bores 15 to secure the tail piece 14 in adjusted position with respect to the body 11. Longitudinal adjustment of the tail piece 14 varies the tone emitted from the body 11.

A bracket 17 is secured to a horizontal slot 18 in the forward end of the plate 10 and clamps to the bicycle frame 19 adjacent the rear wheel 20. A second bracket 21 extends from the rear end of the plate 10 to the brace 22 of the fender 23. The attachment S is arranged in generally central parallel relation to the wheel 20, as can be clearly seen in FIGURE 1.

Referring now particularly to FIGURE 3, a pair of vertically spaced parallel lips 24 are secured to the body member 11 internally thereof adjacent the forward end of the plate 12. A slot 25 is formed in the body member 11 in aligned relation to the lips 24 and an opening 26 is formed in the plate 10 in aligned relation to the lips 24 and the slot 25.

A thin flexible vibrating reed 27 is slidably positioned between the lips 24, extending through the slot 25 and the opening 26. The reed 27 has a plurality of longitudinally spaced bores 28 formed therein for selective engagement by a spring pressed detent ball 29 mounted on the body 11 to secure the reed 27 in adjusted position with respect thereto. By pulling the reed 27 outwardly by its outer end, the operator varies the sound in one way, and by pushing the reed 27 inwardly, the sound will vary in another way.

A sound chamber 30 is secured to the plate 10 on the side thereof opposite the body 11 and positioned slightly above the opening 26. The sound chamber 30 has a flat base portion 31 against which the reed normally rests, and when the wheel 20 of the bicycle revolves the spokes 32 thereof engage the outer end of the reed 27, pulling the same down, as indicated in FIGURE 9, and releasing it so that it can snap back and strike the flat portion 31 of the sound chamber 30, making the desired sound which passes out through the tail piece 14 of the attachment S, making a sound similar to a motor in a vehicle.

An additional sound making device is also provided for use when desired and includes an opening 33 formed in the tapered pointed end 12 of the body 11 and having a reed 34 secured in covering relation to the inner side thereof. As air on the forward movement of the bicycle enters through the opening 33, it will vibrate the reed 34 similar to the operation of reed type musical instruments. The opening 33 and reed 34 may be omitted when found undesirable.

The body 11 is shaped similar to a rocket and has decorative coatings applied thereto of reflecting material, as indicated at 35.

Having thus described the preferred embodiments of the invention, it should be understood that numerous structural modifications and adaptations may be resorted to without departing from the scope of the appended claim.

What is claimed:

A sounding attachment for bicycles of the type including a frame having a spoked wheel rotatably mounted therein comprising an elongated generally flat plate, a semi-cylindrical body secured to said plate and having a pointed forward end and a reduced diameter rear end, a tubular tail piece mounted in the reduced diameter rear end of said body for longitudinal adjustment therein, means on said plate for removably mounting said plate to a bicycle frame, a reed mounted in said body for engagement with said spokes to vibrate said reed on rotation of the bicycle wheel, said reed being transversely adjustable with respect to said body, means on said body for locking said reed in transversely adjusted position with respect to said body, a sound chamber having an open side and a tapered front and a flat bottom striking plate secured to said generally flat plate on the side thereof opposite said body with said reed engaging against said striking plate when released by the spokes of said wheel.

References Cited in the file of this patent

UNITED STATES PATENTS

| | | |
|---|---|---|
| 2,768,474 | Harvey | Oct. 30, 1956 |
| 2,894,357 | Munro | July 14, 1959 |